United States Patent

[11] 3,583,265

| [72] | Inventor | Karl Renger<br>Rommelshausen, Germany |
|---|---|---|
| [21] | Appl. No. | 825,805 |
| [22] | Filed | May 19, 1969 |
| [45] | Patented | June 8, 1971 |
| [73] | Assignee | Firma Krauss u. Reichert<br>Spezialmaschinenfabrik<br>Fellbach, Germany |
| [32] | Priority | May 18, 1968 |
| [33] | | Germany |
| [31] | | P 17 60 453.4 |

[54] MOTOR DRIVEN FABRIC CUTTING MACHINE
7 Claims, 4 Drawing Figs.

[52] U.S. Cl. ..................................................... 83/174,
30/139, 51/249

[51] Int. Cl. ..................................................... B26d 7/12
[50] Field of Search........................................... 83/174;
30/139; 51/249

[56] References Cited
UNITED STATES PATENTS

| 927,689 | 7/1909 | Simon | 30/139 |
|---|---|---|---|
| 1,053,331 | 2/1913 | Waring | 30/139 |

*Primary Examiner*—James M. Meister
*Attorney*—Christen, Sabol and O'Brien

ABSTRACT: Grinding wheels are mounted on a fabric cutting machine having a vertically reciprocatory knife, and are driven by an endless belt arranged on rollers in a serpentine path to operate the grinding wheels in all positions along the knife blade.

MOTOR DRIVEN FABRIC CUTTING MACHINE

The invention relates to a motor driven fabric cutting machine having an elongated vertical reciprocating cutter, provided with at least one revolving grinding wheel, which can be moved up and down along the edge of the cutter blade and whose drive is derived from a fixedly mounted revolving part of the machine.

In the case of previously known fabric cutting machines of this type, the driving arrangements for the grinding devices that can be moved up and down and that are equipped with revolving grinding wheels, are provided in the form of positive drives, such as screw spindles or similar devices. Such devices require a considerable expenditure in production and, moreover, they need attendance and are subject to wear and tear.

The present invention is intended to avoid these disadvantages.

According to the invention, provision has been made for the solution of the problem in that an endless driving belt is provided for the transmission of the torque from the fixedly mounted rotating member of the drive of the cutting machine guided via reversing rollers forming loops, which are provided in an arrangement for adaptation of the driving length to the changing distance between the revolving member of the drive of the cutter and the grinding wheel, which permits the extension of the additional drive length from a correspondingly diminishing loop.

In the case of such a novel construction of the drive for the revolving grinding wheels which can be moved up and down, this will result in a construction which is cheap, safe in operation and yet practically without need of attendance.

In this case it is possible to get along with an endless driving agent, therefore with a string gear or a belt drive or the like, where, despite the change in the distance between the driven member of this drive and the grinding wheel driven by it, the length of the endless driving belt can always remain the same, where two pairs of rollers, mounted so that they can be moved up and down, are inserted in the drive between a fixedly mounted pair of rollers, forming a loop in the belt on the bottom, and a roller forming a loop above and mounted fixedly; of which roller pairs one is mounted at the upper and the other at the lower end of a pedestal which can be moved up and down and around which one loop of the driving belt, that can be moved up and down, is guided without prolongation of the belt, whereby the continued drive to the grinding wheels is derived from the lower pairs of rollers.

Also, the device for switching the drive of the grinding wheels on and off can be executed in a simple construction in the case of the described construction of the drive, by providing for instance, a stop member of a certain length on the housing, which, in the uppermost position of the pedestal, via a rod system, disengages the grinding wheel drive, driven by a fixedly mounted revolving part of the cutting machine.

One embodiment of the invention by way of example has been shown in the drawings and has been explained in the succeeding description.

Figure 3:
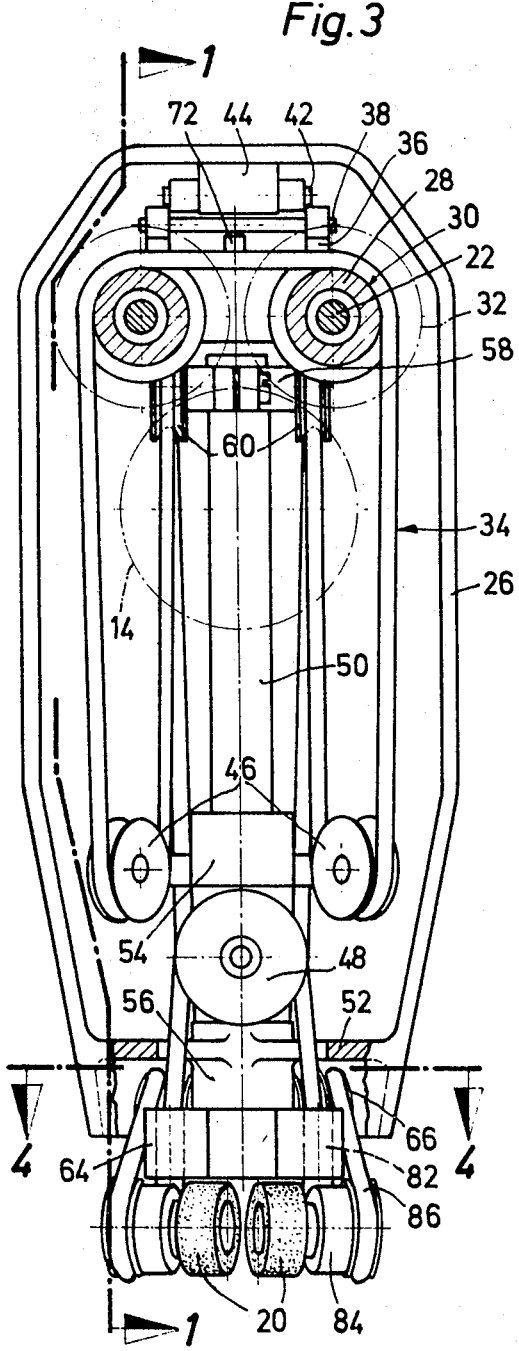
FIG. 3 shows a view taken on line 3-3 of FIG. 1 toward the open side of the hood.
Figure 4:
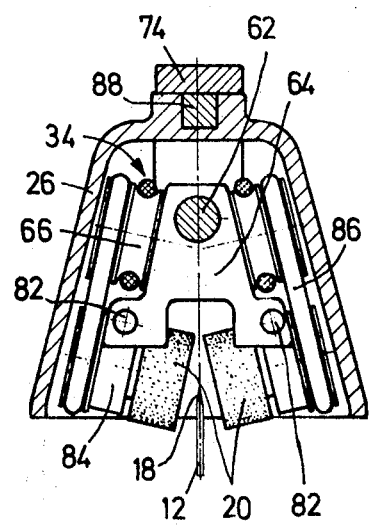
FIG. 4 shows a partial section along the line 4-4 of FIG. 3.

The housing 10 for a fabric cutting machine that can be used and carried by hand is connected to an electric motor (not shown); the motor shaft of rotates a drum 14, representing a fixedly mounted member of the drive of the machine within the frame of the drive for the reciprocating movement of the cutter 12. A support 16 resting on a worktable, (not shown) and on a machine foot, that is to be guided below the stack of fabric, is connected to the underside of the housing 10. In it the rear part of the straight cutter blade 12 is guided in such a manner, that only part 18 of the edge of said cutter lies open. For the occasional resharpening of the edge, two revolving grinding wheels 20, slightly inclined toward one another, are provided (FIGS. 3 and 4). The drive for these grinding wheels 20 is derived from the drum 14.

On the ends of a forklike bearing member 22, which is articulated to an inside eye 24 of hood 26 so that it can be swung up and down, two grooved pulleys 28 are mounted rotatably, which are provided with grooves 30 for the cord 34. On the periphery of one end of the grooved pulleys 28, additionally a friction covering 32 is attached, which is pressed under the weight of the forked arms 22 and rollers 28, and, above all, through the pull of the endless driving belt 34, against the periphery of the crank drum 14 and is connected with the latter in this manner, so that it can transmit torque from the driving motor.

In order to lift the friction cover 32 from the periphery of the drum 14, angular hooks 36 have been provided, which reach with their lower angled ends below the forked arms 22 and which are suspended pendulum fashion from an axle 38 which is attached at the lower side of a swivel carriage 40, which in turn, is articulated on a swiveling pivot 42 at an additional inside eye 44 of the hood 26. Through lifting the swivel carriage 40, the driving connection between the drum 14 and the friction covers 32 can be separated.

The additional grooved pulleys 46, serving as reversing rollers are mounted via suitable pedestals on the inside of the hood 26 and an additional special roller 48 with a horizontally rotating axis is mounted just below these rollers 46.

A pedestal 50 is guided perpendicularly in the inside of the hood 26 in the guide collars 54 and 56 provided on the inside wall of hood 26 and in a transverse wall 52. At the upper end of the pedestal 50, an upper pair of rollers 60 with horizontal axes are mounted via a cliplike bearing plate 58.

At the lower end 62, pedestal 50 carries an additional bearing plate 64 for mounting of a lower pair of rollers 66 which have a pair of grooves for belts one beside the other.

Figure 1:
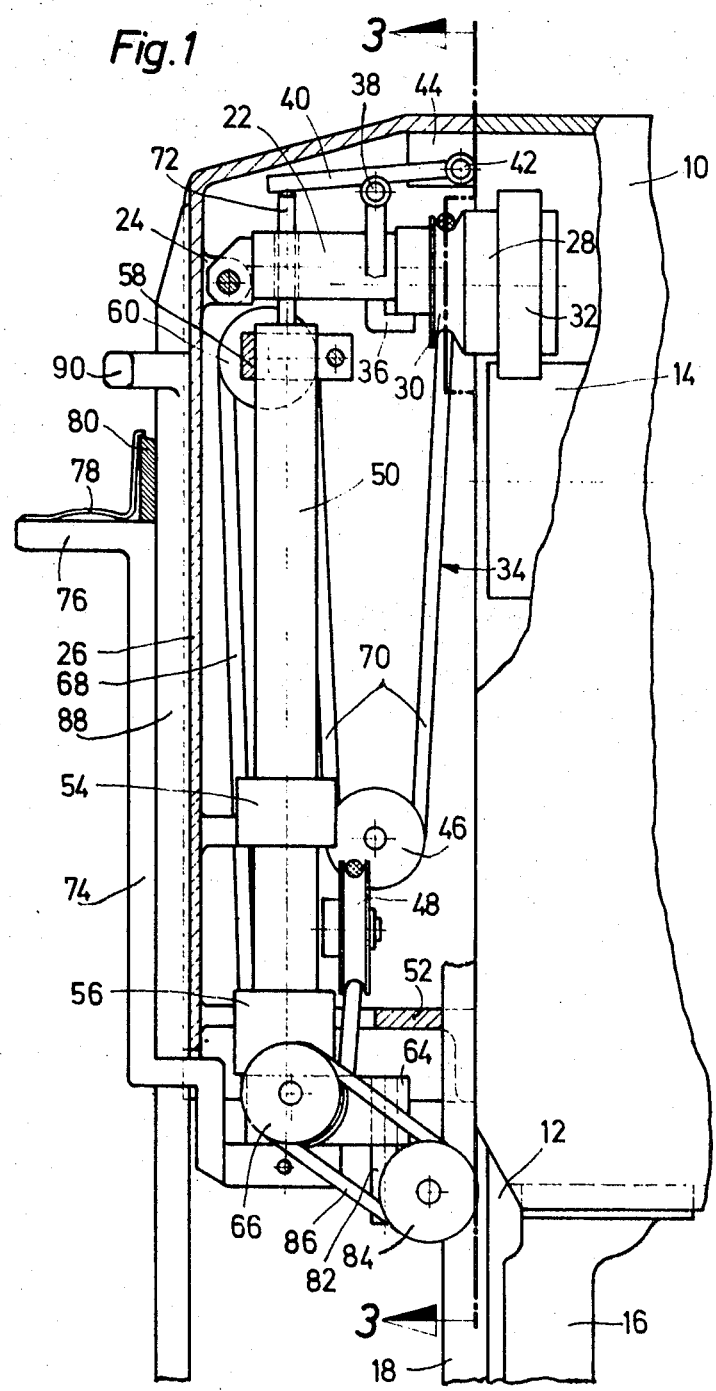
FIG. 1 shows a side view taken on line 1-1 of FIG. 3 showing a part of the fabric cutting machine, showing the housing receiving the drive for the pinion type cutter, containing, the drive for the grinding wheels.
Figure 2:
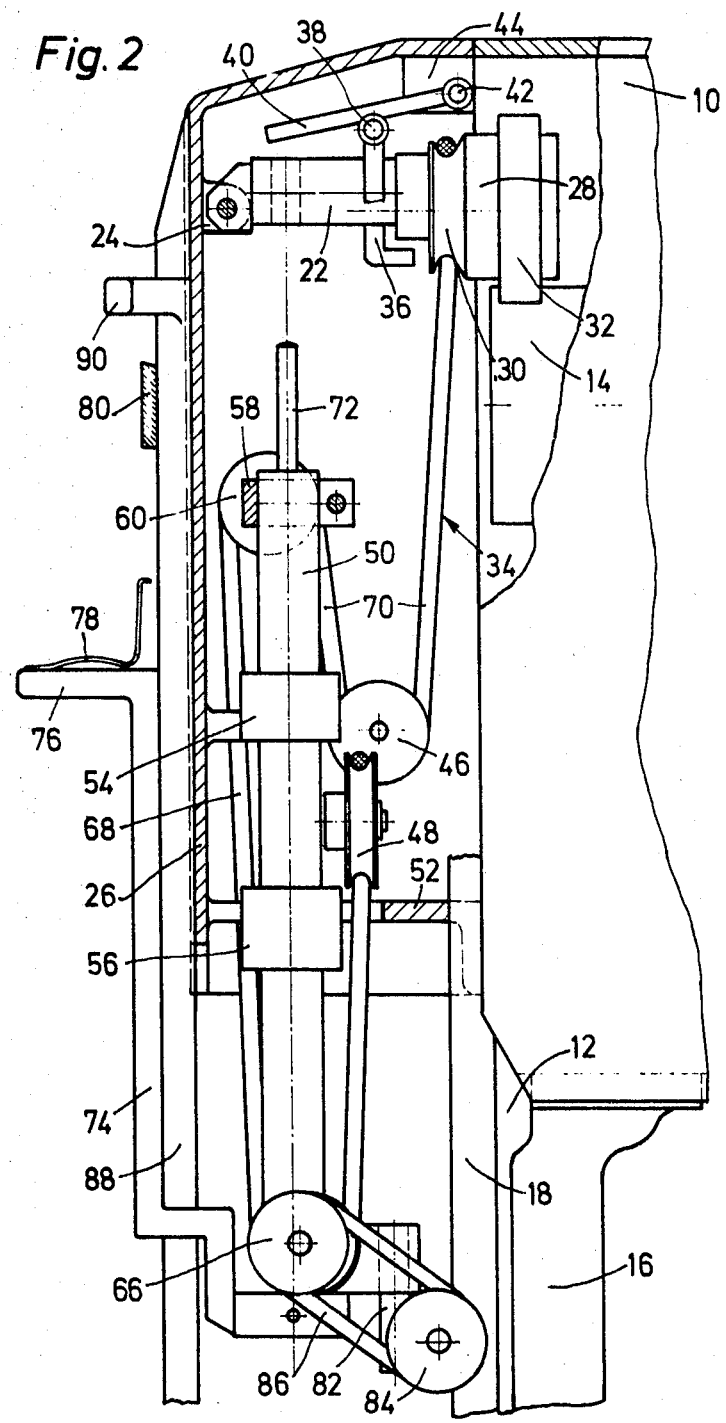
FIG. 2 shows the same view in the case of a different position of the drive of the grinding wheels.

The belt 34 is guided as follows around the above-mentioned grooved pulleys acting as reversing rollers: The belt 34 loops around the fixedly mounted roller 48 from above. The two ends directed downwards each run below around one of the lower rollers 66 that can be moved up and down with the pedestal 50. The ends which then rise, move around the upper side of the rollers 60 provided at the upper end of the pedestal 50 and, run downwardly in order to reach the fixed grooved pulleys 46 around which they loop from below. The ends which rise again then interlock after a right-angled deflection around the grooved pulleys 28 to form an endless belt 34. In their course from roller 48 via the rollers 66 and 60 to the rollers 48, the belt forms a loop 68, which has a length that always remains the same no matter what position is assumed by the pedestal 50 between its two end positions. The belt in its course from the rollers 60 via the rollers 46 to the rollers 28, however, forms a loop 70. In the upper position of the pedestal 50, this loop 70 assumes its greatest length (FIGS. 1 and 3). In the lower position of the pedestal 50, on the other hand, (FIG. 2 shows a middle position, while the lowest position will be achieved only when the bearing plate 58 comes to rest on the guide collar 54), the length of the loop 70 is foreshortened to its shortest value. It suffices to guarantee that in any of the positions of the pedestal the endless belt drive the loop 68 is always of equal length although it is moved up and down with the pedestal.

At the upper end of pedestal 50, there is a stop element 72, which will swing up plate 40 in case pedestal 50 is completely lifted up and will interrupt the driving connection between parts 14 and 32, and thus brings the grinding device to a standstill while the drive of the cutter itself continues to run.

The bearing plate 64 and pedestal 50 are borne by an angular slide 74, which, during the grinding process, is guided up and down with its main part in a groove in the front side of the hood 26 by means of the bent end 76. In the case of this upand-down movement for grinding, the uppermost position drawn in FIG. 1 will not be reached. Only when the pedestal 50 is returned into this uppermost position shown in FIG. 1 after completion of the grinding process, then a stop spring 78 provided at the bend end 76, will snap with a hook over a stop element 80 and, as a result of that, it will hold the pedestal in its uppermost position in which, as explained above, the driving connection between the cutter drive and the drive for the grinding device is interrupted.

Grooved pulleys 84 are attached swivelably to the bearing plate 64 by means of perpendicular bearing pins 82, which pulleys are coupled firmly with the grinding wheels 20. They obtain their drive via endless belts 86 running in the second groove of each roller 66, which as a result of their tension, at the same time will also press the grinding edges of the grinding wheel 20 against each other or against the cutting edge of the cutter 12 which is forced between them.

In the front wall of the hood 26, a bar 88, guided in a groove of said hood, can be seen, which can be moved up and down by means of a handle 90 and has a pressure foot (not shown) pressing against the stack of fabric at its lower end.

It will thus be observed that the grooved rollers mounted on the movable pedestal, and carrying the endless belt in a variable serpentine path, constitutes a power transmission means for connecting the rotating element 14 with the rotatable grinding wheels 20 regardless of their vertical position.

I claim:

1. In a fabric cutting machine having a vertically reciprocatory straight cutting blade driven by a fixedly positioned rotating element and having at least one rotatable grinding wheel mounted on the machine for linearly reciprocating vertical movement relative to said cutting blade while in grinding engagement with said cutting blade, the combination including an endless belt, and power transmission means for connecting the endless belt with the rotating element and the rotatable grinding wheel, said power transmission means including a plurality of rollers for guiding the endless belt in a variable serpentine path, at least one of said rollers being mounted for movement coincidentally with movement of said grinding wheel whereby said rotating element will drive the grinding wheel in all positions thereof.

2. In a fabric cutting machine having a vertically reciprocatory straight cutting blade driven by a fixedly positioned rotation element and having at least one rotatable grinding wheel mounted on the machine for vertical movement in engagement with said cutting blade, the combination including an endless belt, and power transmission means including a plurality of rollers for guiding the endless belt in a variable serpentive path, a vertically movable supporting means, at least two of said rollers for the endless belt mounted on said supporting means in spaced relationship, and at least two other rollers for the endless belt mounted in fixed locations of the machine whereby said rotating element will drive the grinding wheel in all positions thereof.

3. The invention defined in claim 2, wherein a pair of grinding wheels are mounted on said movable supporting means for rotation about angularly related horizontal axes, said mounting including means for swinging said wheels about vertical axes for converging engagement with opposite sides of the cutting blade and yieldable driving means for urging said engagement.

4. The invention defined in claim 2, wherein the power transmission means includes means for disconnecting the endless belt from said rotating element, and said means for mounting the grinding wheel for vertical movement includes means for actuating said disconnecting means when the grinding wheel is in a predetermined position.

5. The invention defined in claim 4, wherein said disconnecting means includes roller means mounted on a movable axis, whereby said roller means is movable for frictional engagement and disengagement with said rotating element.

6. The invention defined in claim 1 wherein the power transmission means includes means for disconnecting the endless belt from said rotating element, and said means for mounting the grinding wheel for vertical movement includes means for actuating said disconnecting means when the grinding wheel is in a predetermined position.

7. The invention defined in claim 6, wherein said disconnecting means includes roller means mounted on a movable axis, whereby said roller means is movable for frictional engagement and disengagement with said rotating element.